United States Patent [19]

Bennett et al.

[11] Patent Number: 4,802,684
[45] Date of Patent: Feb. 7, 1989

[54] MOTORCYCLE FLOORBOARD DEVICE

[76] Inventors: William R. Bennett, 14317-139th Ave. Ct. West, Edgington, Ill. 61284; Tom Mix, 8216 50th St., Coal Valley, Ill. 61240; James F. Smith, 4102 8th Ave., Moline, Ill. 61265

[21] Appl. No.: 450,977

[22] Filed: Dec. 17, 1982

[51] Int. Cl.$^4$ ............................................... B62J 25/00
[52] U.S. Cl. .................................... 280/291; 280/304.4
[58] Field of Search .................. 280/291, 163, 289 E, 280/289 G, 301, 303; 180/219

[56] References Cited

U.S. PATENT DOCUMENTS

| | | | |
|---|---|---|---|
| 1,116,420 | 11/1914 | Harley | 280/291 |
| 1,261,442 | 4/1918 | Rigby | 280/291 |
| 1,675,551 | 7/1928 | Harley et al. | 280/301 |
| 2,285,313 | 6/1942 | Tagliaboschi | 280/303 |
| 3,794,353 | 2/1974 | Oliver | 280/291 |
| 3,902,704 | 9/1975 | Lucier et al. | 280/289 G |
| 4,174,852 | 11/1979 | Panzica et al. | 280/291 |

OTHER PUBLICATIONS

BMS Manufacturing, Advertising Brochure, published .

Primary Examiner—David M. Mitchell
Assistant Examiner—Mitchell J. Hill

[57] ABSTRACT

A convenient foot rest device is provided for attachment to motorocycles without requiring any modifcation to or defacing of the motorcycle. The device includes a heavy gauge, tubular support frame which is shaped to conform to the contours of a high performance motorcycle, and to be mounted below the engine of such motorcycle, by means of engine and foot peg mounting bolts. A floorboard is pivotally attached onto the support frame in order to provide a floorboard upon which a rider may rest his feet or to flip up to a storage position.

5 Claims, 1 Drawing Sheet

U.S. Patent  Feb. 7, 1989  4,802,684
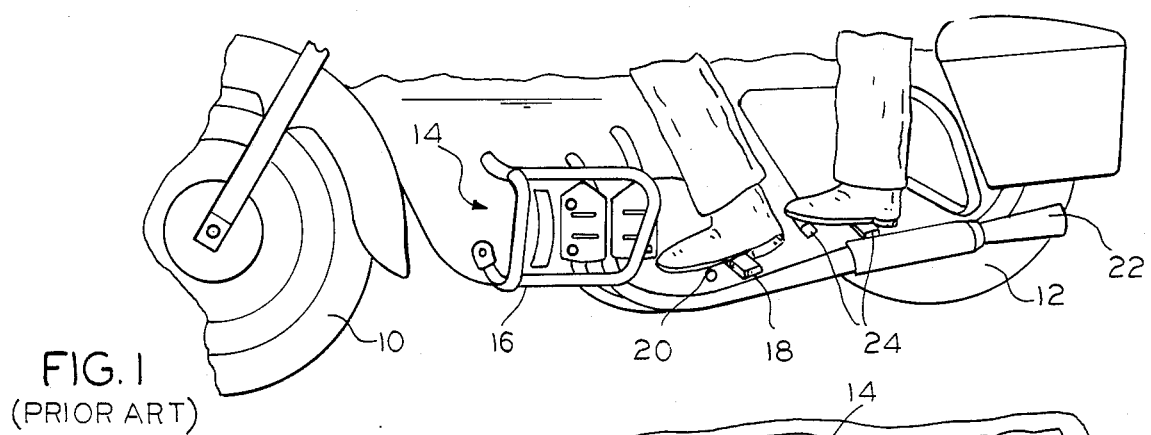
FIG. 1 (PRIOR ART)
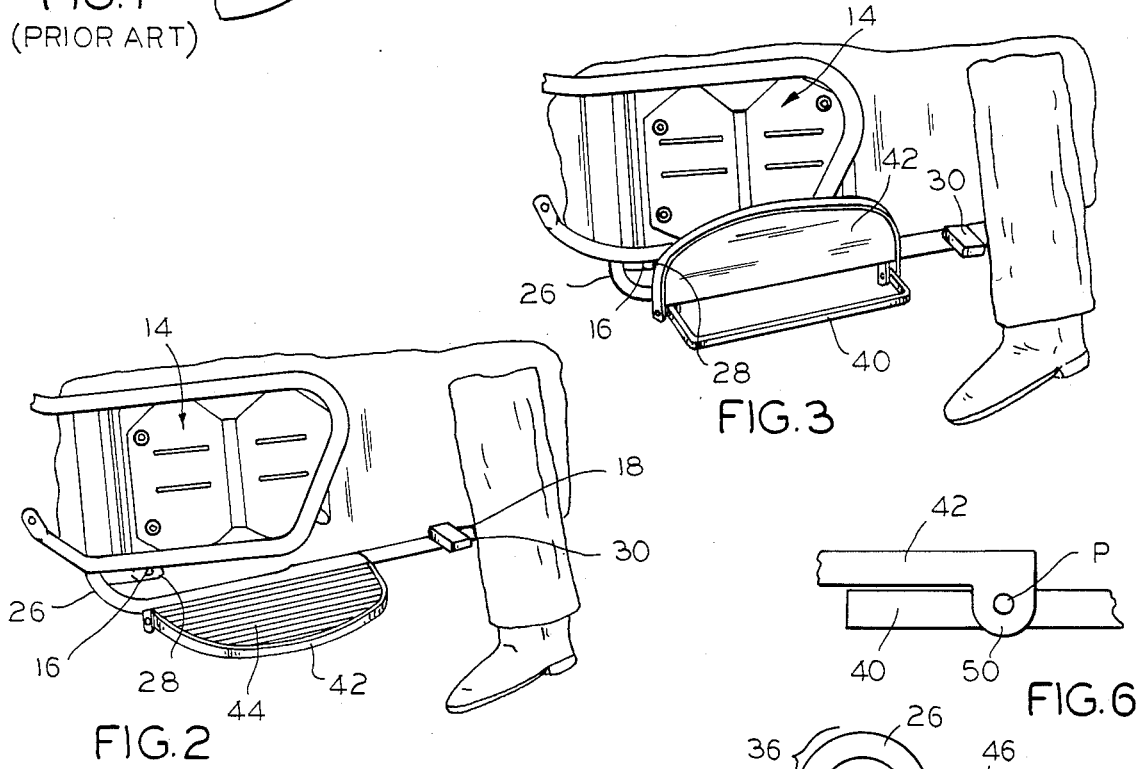
FIG. 3
FIG. 2
FIG. 6
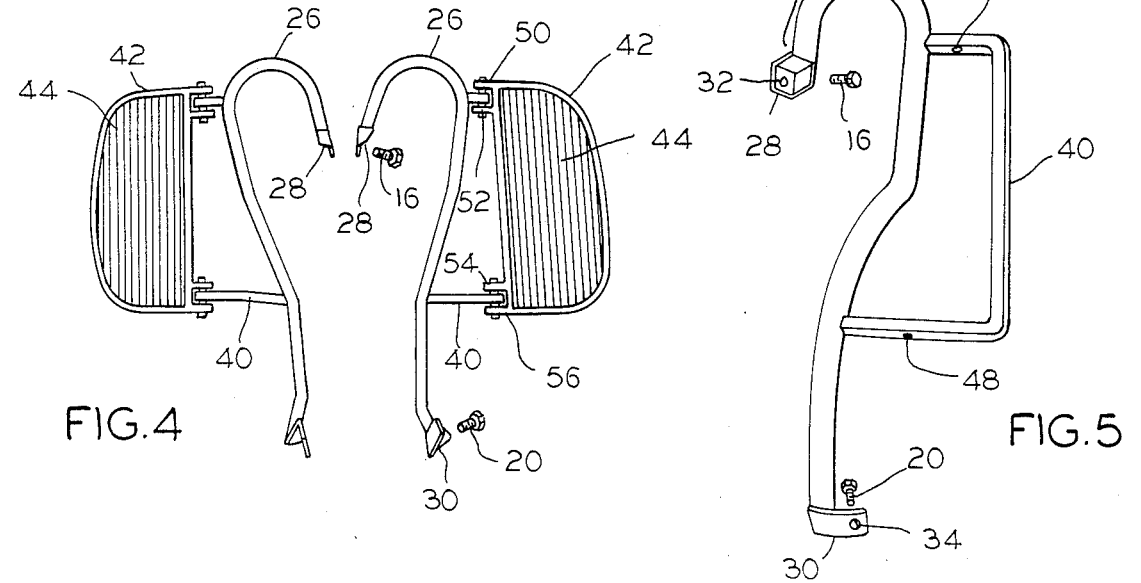
FIG. 4
FIG. 5

MOTORCYCLE FLOORBOARD DEVICE

This invention relates to convenience and accessory devices for comfortably supporting a motorcycle rider's feet while the motorcycle is in motion and, more particularly, to devices which do not interfere with other features of the motorcycle and which do not prevent the rider from placing his full foot on the ground for supporting the motorcycle while it is stopped in an upright position.

In the following specifications it will be convenient to describe the invention in connection with a high performance Honda G.L. 1000 motorcycle or a Honda G.L. 1100 motorcycle. However, both the invention and the appended claims should be construed broadly enough to cover all uses with any similar motorcycles.

The prior art includes a number of devices for supporting a rider's feet, while he is operating a motorcycle. For example, see the devices which are shown in U.S. Pat. Nos. 1,116,420; 1,261,442; and 3,794,353. However, these and other similar devices do not readily combine with four cylinder high performance motorcycles, of types which are presently available. Moreover, the prior art devices do not provide a floorboard type of foot rest which enables the rider to enjoy a much more natural and comfortable foot position, as compared with the "foot peg" type of foot rests that are usually mounted high on the frame or fork of a motorcycle.

Among other things, the configuration of a standard high performance motorcycle hinders an attachment of accessories thereto. Typically, such a high performance motorcycle has a four cylinder engine with pistons mounted in a horizontally operating position. Because of its size and configuration, such a high performance engine mounting causes the width of the motorcycle body to be broadened and the clearance between the ground and frame to be reduced, as compared to the width and clearance of other motorcycles. This body size and low clearance precludes a mounting of accessories below the frame that holds and supports the engine and it severely restricts the mounting of accessories which extend horizontally away from the frame, because the engine occupies most of that previously available space.

Another consideration for mounting accessories on the frame of a motorcycle relates to the location of foot controlled parts, such as the kick starter, shifter, or brake peddle. The foot controlled movements of these parts must not be impeded by an accessory.

Still another consideration is that the location of an accessory must not preclude the rider from resting his full foot on the ground so that he may balance the motorcycle while it is not in motion.

Accordingly, an object of this invention is to provide new and improved accessory devices which enable a motorcycle rider to rest his feet in a comfortable and natural position while he is riding a motorcycle.

Another object is to provide foot rests which may be easily attached to high performance motorcycles, with the points of attachment being in locations that do not either diminish the ground to frame clearance or interfere with previously existing equipment on the motorcycle.

Yet another object is to provide a device which may be mounted on the motorcycle without having to either disassemble a substantial portion of the motorcycle or reposition any of the kick starters, brake peddles, shifter levers, or other equipment.

Still, another object of this invention is to provide economical and attractive devices which can be mounted on motorcycles, and then used as a foot rest accessory.

Another object of the invention is to provide a foot rest of the described type which does not appreciably either broaden the width of a motorcycle or interfere with the rider's leg and leg motion, to such an extent that the rider cannot place his full foot on the ground.

In keeping with an aspect of the invention, these and other objects are accomplished by an accessory for providing a floorboard or similar device, which is mounted on either or both sides of a motorcycle and especially a high performance motorcycle. The accessory includes an elongated tubular support frame which is shaped and configured to be attached to the front of the engine block mount and to the rear foot peg of the motorcycle. The attachment is made by way of drilled flanges welded or otherwise attached at opposite ends of the elongated support. Both front and rear attachments are made by removing the bolts that hold the front motor mount and operator's foot peg. The drilled flanges are mounted upon those bolts which are then reinserted into their original location and suitably tightened. Pivotally attached to the support frame in a position beside and below the head of the engine is a foot pad or floorboard composed of a metal base with a ribbed rubber mat cemented thereto.

The above mentioned and other features of the invention and the manner of obtaining them will become more apparent, and the invention will be best understood by reference to the following description of the invention, in connection with the accompanying drawings, wherein:

FIG. 1 is a perspective view showing part of a prior art motorcycle with foot pegs, and showing the rider's feet as they are supported while the motorcycle is in motion;

FIG. 2 shows the inventive device while it is being used with the motorcycle stationary and the rider's feet flat on the ground in order to balance the motorcycle;

FIG. 3 shows the inventive device with the floorboard folded up to remove it from contributing to the effective width of the motorcycle;

FIG. 4 is a plan view showing the top side of the inventive device, and also showing the manner of attaching it to the motorcycle;

FIG. 5 is a bottom plan view of the device, without the floorboard, showing how the floorboard is supported when it is down and in an operating position; and FIG. 6 shows the manner of mounting the floorboard onto the frame.

FIG. 1 shows part of a conventional high performance motorcycle 60 such as a Honda G.L. 1000 or Honda G.L. 1100. As should be apparent, the motorcycle comprises front and rear wheels 10, 12, engine or motor 14, front engine block mount bolt 16, front rider foot peg 18, foot peg mounting bolt 20, and exhaust pipe 22. Conventionally, both front and rear riders must rest their feet on foot pegs 18, 24 which project horizontally away from the frame. These pegs are not the most comfortable foot supports. Also, they do not provide very much protection for the foot if a side swipe should occur. On the other hand, the pegs are not in the way if the rider wants to operate a starter or to put his foot flat on the ground in order to balance his motorcycle while it is stopped.

FIGS. 2 and 3 are shown with the inventive floorboard and supported device bolted to the motorcycle by means of the front engine block mounting bolt 16 and the front rider's foot peg mounting bolt 20.

The inventive accessory is comprised of an elongated tubular support frame 26 which, in the preferred embodiment, is formed from chrome plated, one-inch diameter, eleven gauge welded tubing. Disposed on either end of the elongated support frame 26, are aperatured mounting flanges 28 and 30 which can be best seen in FIGS. 4 and 5. Flanges 28 and 30 are preferably welded to support frame 26. In the preferred embodiment, flanges 28 and 30 are formed from stamped or cast metal plates which are configured to provide a mounting surface at the two end positions of elongated frame 26 which correspond to the locations of mounting bolts 16 and 20.

As best shown in FIG. 5, frame support 26 is configured to provide a horizontal mounting bar portion 36 which fits directly below the engine head and at the mounting bolt 16. From there, the frame curves out and around adjacent motorcycle parts and returns to come into contact with the frame at the point where the front foot peg bolt 20 fits onto the frame. Welded to the frame 26 is a second generally U-shaped frame 40 which forms a closed loop and fits under the floorboard to support it and keep it in a firm and generally horizontal position. The floorboard includes a metal foot pad 42 which is covered by a ribbed rubber mat 44.

The mounting of the floorboard is accomplished by welding the second frame 40 to the support frame 26. The metal loop formed by second frame 40 has two mounting apertures 46, 48 (FIG. 5) positioned therein. The bottom of the foot pad 42 has two spaced parallel pairs of dependent ears 50, 52, 54, 56 which straddle bar 40 in the area of the two mounting holes 46, 48. Therefore, as seen in FIG. 6, passing through the holes in each pair of these ears and through the respective holes 46, 48 is a pin P which acts as a hinge pin for enabling the floorboard to be raised and lowered.

In the preferred embodiment, metal foot pad 42 is cast aluminum and sized to comfortably receive and support the foot of a motorcycle rider. Adhesively affixed to the upper surface of metal foot pad 42 is a ribbed, rubber mat 44 which provides a comfortable, slip resistant surface upon which the rider may rest his foot. The friction at the surface 44 enables the rider to stand securely thereon.

As shown in FIG. 2, the rider may flip the floorboard 44 down to a horizontal position for use as a foot rest. Or, as best seen in FIG. 3, for its out of the way storage, the rider may raise the floorboard 42 to an upright or vertical position, by flipping it up with his toe. When this happens, the total width of the motorcycle, or horizontal extension of the accessory is reduced from the width of the floorboard 42 to the width of the second frame 40. Thus, the rider may find it easier to place his foot on the ground or to push the motorcycle through a narrow opening if he raises the floorboards.

The advantages of the inventive device are that a comfortable foot rest may be readily attached to the motorcycle by bolts at specific pre-existing bolt hole locations, without requiring a rearrangement or relocation of other equipment that is mounted near that location. The ground clearance of a low slung, high performance motorcycle is not diminished. The floorboard may be effectively removed by flipping it up.

Those who are skilled in the art will readily perceive how to modify the invention. Therefore, the appended claims are to be construed to cover all equivalent structures which fall within the true scope and spirit of the invention.

We claim:

1. An accessory device for attachment to a motorcycle of a type having a roll bar associated with at least its motor, said accessory device comprising means including an elongated support frame to be attached at one end to said motorcycle at a motor mount location and at the other end to a foot peg location near the back of the motorcycle, said support frame providing means for resting and supporting the foot of a motorcycle rider on a pivoted pad, said elongated support frame having mounting means disposed on opposite ends of the elongated frame, said mounting means being shaped and dimensioned to be attached to said motorcycle by fitting under existing bolts at said motor mount location and at said foot peg location on said motorcycle, and said pivoted foot pad means hingedly affixed to said support frame to pivot between a horizontal position for use and a vertical position for out-of-the-way storage.

2. The device of claim 1 wherein said mounting means comprises a pair of metal mounting flanges, each flange having an aperture formed therein, said apertures being positioned at said locations whereby said frame may be affixed to the motorcycle by removing said existing bolts, then passing said bolts through said apertures, and returning said bolts to said existing locations for bolting the flanges to the frame of the motorcycle.

3. An accessory device for resting the motorcycle rider's feet for mounting on a motorcycle of a type having a roll bar associated with its motor, said accessory device including an elongated frame comprising a generally tubular member shaped to fit around and close to the contours of said motorcycle, said contours extending from an existing motor mount bolt position continuing along a length of the motorcycle and ending at a foot peg position, mounting means attached to opposite ends of said elongated frame at locations which correspond to the positions of said existing motor mount bolt and said foot peg position on said motorcycle, a second frame rigidly attached to said elongated frame, and foot pad means hingedly affixed to a hinge affixed to said second framw with said second frame passing under said foot pad means to limit downward travel of said foot pad means when it moves on said hinge, so that the device may be attached to the motorcycle with no modification to the motorcycle.

4. The device of claim 3 and a high friction covering for said foot pad means.

5. The device of claim 4 wherein said elongated frame and second frame are generally configured so that when said foot pad means is swung on said hinge to a stored position, the overall width of said motorcycle is substantially unaffected by the presence of said device.

* * * * *